Aug. 7, 1923.　　　　　　　　　　　　　　1,464,351
W. P. CASEY
TOOL
Filed Nov. 26, 1920　　　　2 Sheets-Sheet 1

Inventor:
William P. Casey.
By Morsell & Keeney.
Attorneys

Aug. 7, 1923. 1,464,351
W. P. CASEY
TOOL
Filed Nov. 26, 1920 2 Sheets-Sheet 2
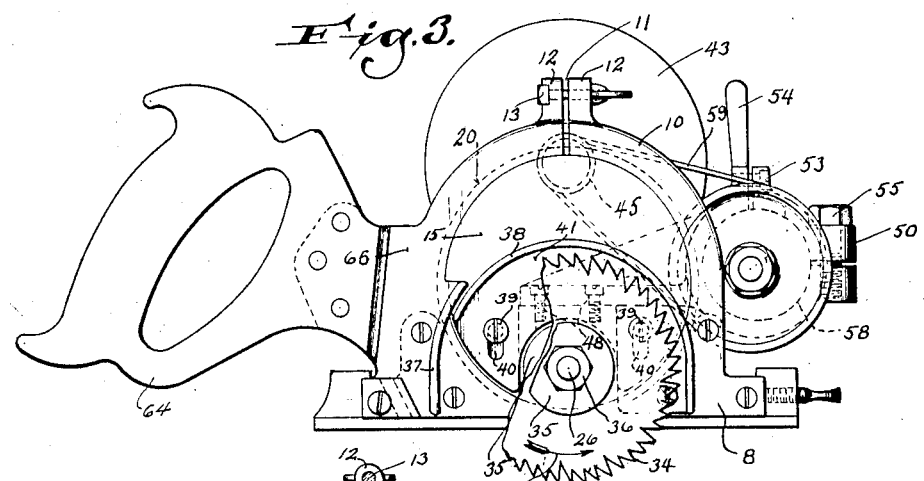
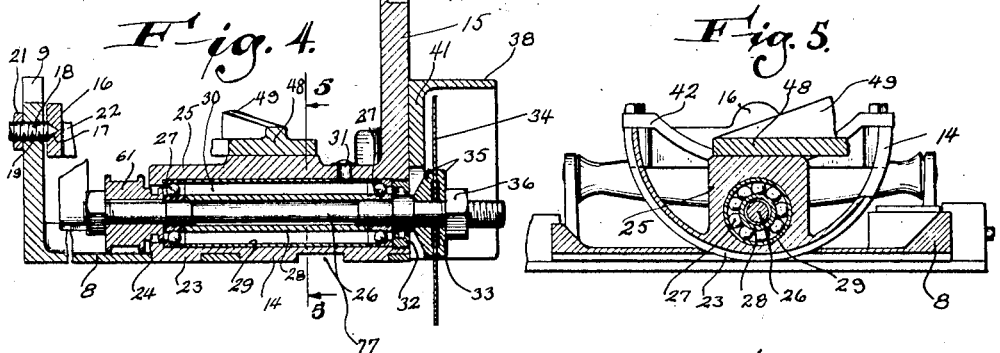
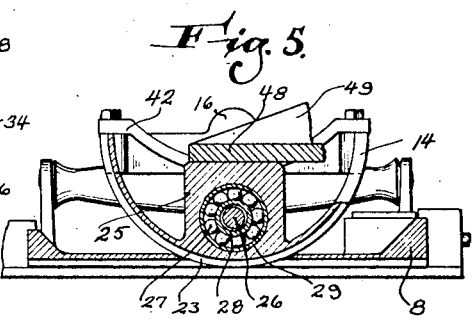
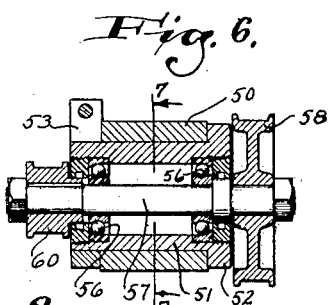
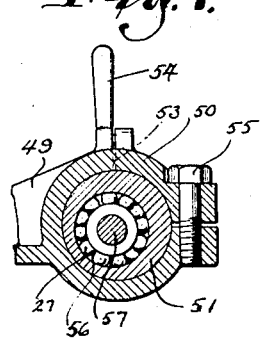
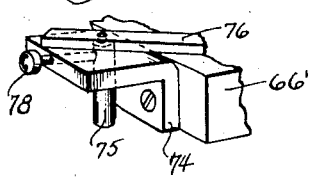
Inventor.
William P. Casey.
By Morsell & Keeney,
Attorneys Patented Aug. 7, 1923.

1,464,351

UNITED STATES PATENT OFFICE.

WILLIAM P. CASEY, OF OSHKOSH, WISCONSIN, ASSIGNOR TO THE ROUTER MANUFACTURING COMPANY, OF OSHKOSH, WISCONSIN, A CORPORATION OF WISCONSIN.

TOOL.

Application filed November 26, 1920. Serial No. 426,589.

*To all whom it may concern:*

Be it known that I, WILLIAM P. CASEY, a citizen of the United States, and resident of Oshkosh, in the county of Winnebago and State of Wisconsin, have invented new and useful Improvements in Tools, of which the following is a description, reference being had to the accompanying drawings, which are a part of this specification.

This invention relates to certain new and useful improvements in tools and refers more particularly to a portable general utility tool especially adapted for use in connection with woodworking.

It is one of the objects of this invention to provide a compact unitary tool for general woodwork to be used as a portable electric saw with various types of cutters.

It is another object of this invention to provide a device of the class described including a frame contructed to be moved over the surface to be worked upon and having a rotatable member upon which is mounted all the working parts of the tool.

The invention has for a further object to provide a tool of the class described capable of use with other arts than that of woodworking and so designed and constructed as to permit its production without the necessity of careful hand fitting whereby the same may be produced at a comparatively low cost.

A still further object of this invention is to provide a tool of the class described capable of adjustment to cut at various depths and at different distances from the edge of the material being worked upon.

And still another object of this invention is to provide a tool of the class described including a rotatably mounted skeletonized drum carrying a drive motor in connection with a tool shaft journaled in the drum by means of a reduction device also carried by the drum whereby the relation of the motor shaft, the reduction device shaft, and the tool shaft will always be the same irrespective of any movement given said drum, said reduction device having means for adjusting its shaft to take up slack in the connections between it and said motor and tool shafts.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 3 is a view looking at the end of the device carrying the tool or cutter, the cutter being partly broken away to more clearly illustrate structural details;

Figure 4 is a fragmentary view, part in section and part in elevation, said view being taken on the plane indicated by the line 4—4 of Figure 1;

Figure 5 is a fragmentary sectional view taken transversely through Figure 4, on the line 5—5;

Figure 6 is a sectional view taken through the reduction device on the line 6—6 of Figure 1;

Figure 7 is a view taken on the line 7—7 of Figure 6; and

Figure 8 is a fragmentary perspective view illustrating a mitre attachment adapted for use in connection with my improved tool.

Referring now more particularly to the accompanying drawings, in which like numerals designate like parts throughout the several views:

Figure 1:
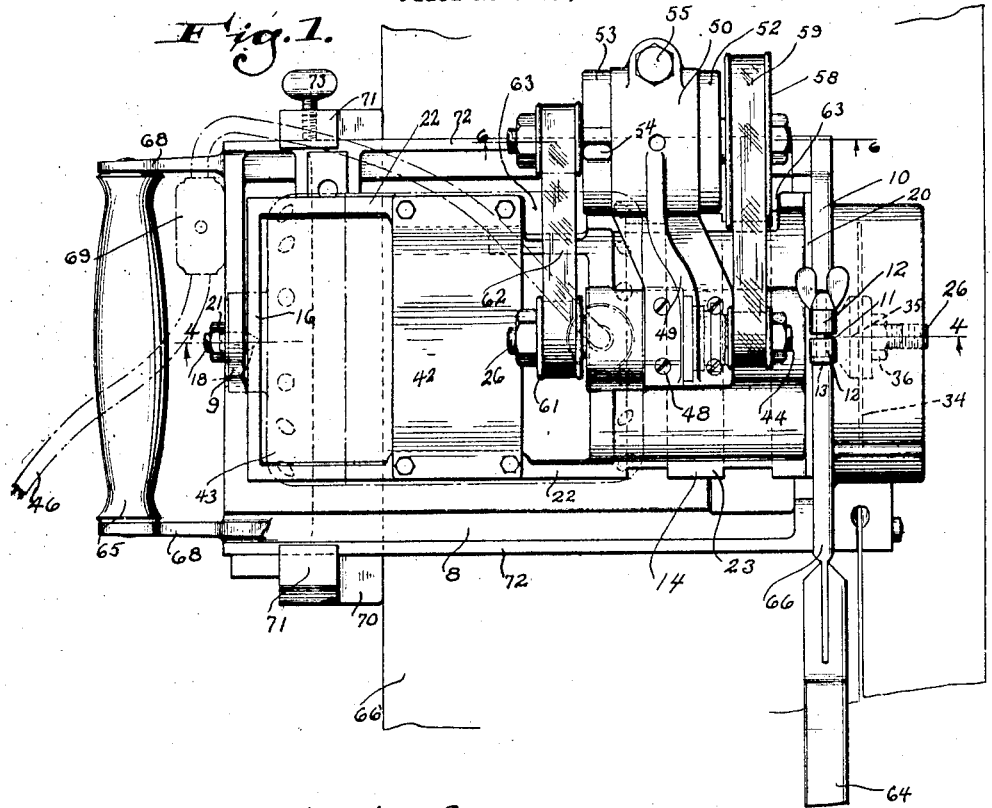
Figure 1 is a top plan view of my improved tool, the drive motor, with the exception of its pulley, being shown in light conventional lines in order to more clearly illustrate the other structural details of the tool.

The numeral 8 designates a supporting frame, which may be of any desired shape but is shown in the drawings as of substantially rectangular form; 9, an upstanding ear or lug formed on one end of the frame; and 10, a centrally bored upstanding projection at the opposite end of the frame, which projection is split, as at 11, to form, what may be termed, a split ring. The projection or ring 10 is provided with upstanding ears or lugs 12 adjacent the split for engagement with a clamping bolt 13, which serves to move the split ends toward or away from each other to decrease or increase the diameter of the bore of said projection.

A drum 14 is rotatably mounted in the frame 8, one circular end 15 being rotatably mounted within the bore of the projection 10 and its other end 16 being provided with an indentation or recess 17 in axial alinement with the end 15, which recess is engaged by the inner pointed end of a threaded bearing screw 18 having a threaded connection in an opening 19 in the standard 9, see Fig. 4 which opening is in axial alinement with the center of the bore of the projection 10. The end 15 has an annular rib 20 formed thereon for engagement with the inner face of the projection or ring 10 to prevent the lateral play of the drum within the frame, and the screw 18 is locked in adjusted position by a nut 21.

The drum 14 is preferably cut away or skeletonized with the portion rearwardly of its end 15 of approximately semi-circular shape in transverse section and the major portion of the drum is further skeletonized to form two rearwardly extending spaced side arms 22 which are connected by the end 16. This construction permits the elimination of all excess metal and is a step toward obtaining a machine of the class described which will be of comparatively light weight. Lateral play of the drum within the frame 8 may be also prevented by providing the periphery of the semi-circular shaped part of said drum with circumferentially extending portions 23, which engage within the recesses 24 formed in the adjacent portion of the frame.

The substantially semi-circular portion of the drum 14 has a longitudinally extending tubular part or housing 25, in the bore of which is journaled a tool arbor or shaft 26, said shaft being parallel with, but offset from, the axis of the drum 14, whereby a rotation of the drum will adjust said shaft to vary the distance between its center and the work engaging face of the frame. The shaft 26 is provided with ball bearings 27 adjacent the ends of the part 25, and the retaining rings of said bearings are maintained in spaced relation by two sleeves 28 and 29, which sleeves are of different diameters to provide an oil chamber 30 for supplying lubricant to said bearing. The oil is placed in the chamber 30 through a covered opening 31, see Figure 4, and lubricant is prevented from leaking out onto the cover proper by a cap 32 having threaded engagement in the end of the enlargement communicating with the end 15 of the drum, which cap is provided with a suitable packing for engaging the adjacent part of the shaft.

The end 33, of the shaft 26, which is projected beyond the end 15 of the drum has a cutter, or any other desired tool 34 adjustably secured thereto between two clamping washers 35 by a binding nut 36. The part of the tool 34 disposed above the lower work engaging face of the frame is enclosed by a two part guard, one part 37 of which is formed integral with the projection 10 and the other part 38 is carried by the end 15 of the drum 14. The part 38 is adjustably secured to the drum by fastenings 39 which pass through elongated apertures 40 in the inner vertically extending wall 41 thereof. The guard part 38 is carried by the drum so that when adjusted to various positions no part of the upper portion of the cutter will be left uncovered, as will be readily apparent.

Figure 2:
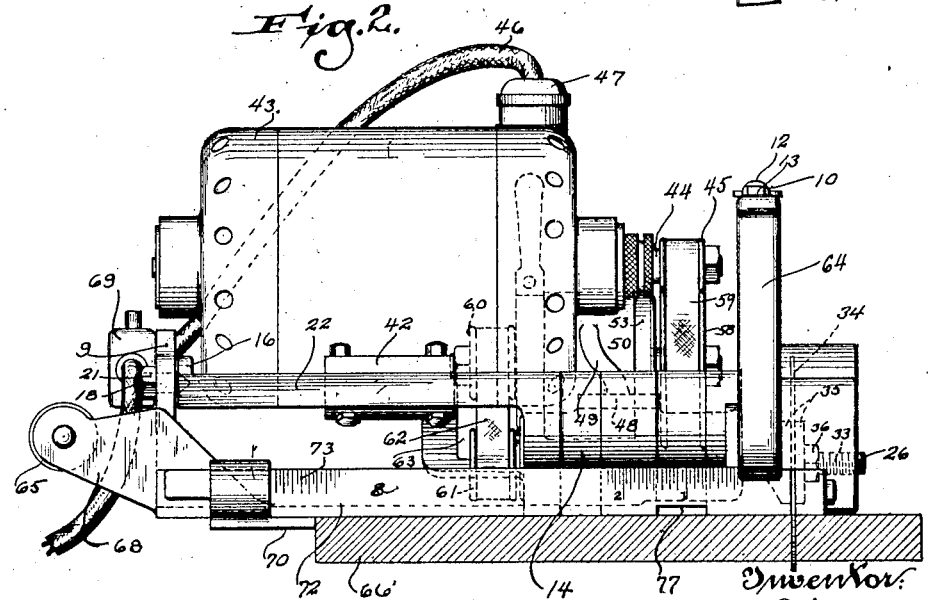
Figure 2 is a side view, in elevation, of the complete tool.

The arms 22 of the drum 15 are connected together by a strap or support 42 see Figs. 1, 2 and 5 upon which is rigidly secured a drive motor 43, preferably of the electrically driven type. The motor 43 is thus made rigid with the drum and has its drive shaft 44 provided with a relatively small pulley 45 which is connected to the tool arbor or shaft 26 through reduction means hereinafter described. The motor is connected with any desired source of electrical supply through a cord 46 by a detachable plug connection 47 so that the same may be readily disconnected to permit the bodily removal of the drum and parts carried thereby without the necessity of employing tools to disconnect the feed wires.

Secured, as at 48, to the tubular part 25 is a laterally and upwardly extending arm 49 having its outer end provided with a split bearing member 50 in which is rotatably mounted an eccentrically bored bushing 51. The bushing 51 has one end flanged, as at 52, for engagement with the adjacent end of the bearing 50 and has an annular member 53 detachably secured to the other end thereof engaging the adjacent face of said bearing member, whereby the bushing is secured therein. The annular member 53 is provided with a handle 54 so that the bushing may be rotated to various adjusted positions, and the bushing is frictionally held in adjusted position by a bolt 55 fastened to alined lugs of the bearing member, see Figure 7.

In the eccentrically positioned bore of the bushing, near the ends thereof, are two ball bearing members 56 which journally mount a counter-shaft 57. Mounted on one end of the shaft 57 in line with the motor drive pulley 45, is a relatively large pulley 58 which is connected with said drive pulley by a belt 59. Mounted on the other end of the shaft 57 is a relatively small pulley 60 in line with a slightly larger pulley 61 mounted on the inner end of the tool arbor 26 and connected therewith by a belt 62.

The adjacent side of the semi-circular portion of the drum 14 is cut away, as at 63 Fig. 1, to permit the passage therethrough of the various drive belts, and from this construction, it will be readily seen that the entire drive mechanism of the tool is carried by the drum 14. The belts 59 and 62 are adjusted by rotating the bushing 51 within its bearing by reason of the shaft 57 being offset from the center thereof, as will be readily obvious. With this form of mounting, the necessary speed reduction of the motor is retained and the drum 14 may be freely adjusted to govern the cut of the tool 34 without changing, in any manner, the connection of the shaft 26 with the drive motor.

The frame 8 is provided with two handles 64 and 65 adjacent the ends thereof for convenience in guiding the same over the material to be operated upon, which may be, as illustrated in Figures 1 and 2, a board or plank 66', and the handle 64 is in the form of a saw-grip and is secured to an extension 66 of the projection 10. The handle 65 is formed by a grip confined between two laterally extending projections 68 forming extensions on the sides of the frame. Secured to the end of the frame, adjacent the handle 65, is a switch mechanism 69 through which the electrical cord 46 passes so that the motor 43 may be readily connected and disconnected with its electrical circuit without removing the hand from position.

In order to assist in guiding the tool over the material being cut, a guide bar 70 is slidably mounted on the underside of the frame by its two guide portions 71 engaging the sides 72 of the frame. One portion 71 carries a binding screw 73 for securing the same in adjusted position, and one side 72 of the frame has a graduated scale 73 delineated thereon in order that the guide bar 70 may be readily set to have the tool cut a board the desired width. If it is desired to cut from the center of the material, the guide bar may be dispensed with, as will be readily obvious.

The tool shaft 26 is designed to rotate in the direction of arrow 26', Figure 3, so that the cutter blade 34 will rotate and have its lower portion travelling in a direction reverse to the normal direction of movement of the tool as a unit. This construction eliminates the necessity of a weight or of energy on the part of the operator to hold the tool into the work, as the cutter obtains an underbite and pulls the tool frame down on the work, as will be readily obvious.

In Figure 8 I have illustrated a mitre attachment which may be employed in connection with my improved tool, and consists of a bracket member 74 adapted to be secured in any desired manner to the side of the work being operated upon and has in its top face an opening in which is rotatably mounted the stud 75 of a guide bar 76. The guide bar 76 is of a thickness and width equal to a transverse recess 77 in the underside of the tool and is adapted to be secured in adjusted position by means 78 engageable with the stud 75. From this construction it will be readily seen that the mitre guide bar may be firmly secured in the desired adjusted position without the necessity of employing tools or the like.

From the foregoing description taken in connection with the accompanying drawings, it will be at once apparent to those versed in the art to which an invention of this character appertains, that I have provided a portable tool unit capable of use, not only in connection with woodworking, but metal working and other similar arts where the tool will perform its functions in an efficient manner, and it will also be apparent that the rotary cutter 34 or any style of tool may be employed.

What I claim as my invention is:

1. A tool comprising a frame having a work engaging face and a vertical centrally bored standard, a drum having a part rotatably mounted in said standard, a tool shaft journaled in said drum and offset with respect to the axis thereof, whereby a rotation of said drum will adjust the distance between the work engaging face of the frame, said standard having a part split, means for drawing the split parts of said standard together to clamp the drum in adjusted position, and means for operating the tool shaft.

2. A tool comprising a frame, a drum member rotatably mounted in the frame, a tool shaft journaled in said drum and offset with respect to the axis thereof, a tool mounted on one end of the shaft, a two part guard for the tool including one part carried by the frame and a second part carried by said drum, and means for operating the tool shaft, said shaft being adjusted by partial rotation of the drum member.

3. In a tool of the class described, a frame; a motor rigidly mounted on said frame; a cutting tool eccentrically mounted in said frame for adjustment relative thereto; a countershaft also eccentrically mounted on said frame; driving connections between said motor and said countershaft, and between said countershaft and said cutting tool; and means for shifting the eccentric carrying said countershaft to maintain said driving connections operative when the position of said cutting tool is changed.

In testimony whereof, I affix my signature.

WILLIAM P. CASEY.